United States Patent
Camardella

[15] 3,663,789
[45] May 16, 1972

[54] WELDING APPARATUS OF WIRE TERMINALS ON ELECTRONIC COMPONENTS

[72] Inventor: Giuseppe Camardella, Via Azio Biondi-1, 20154 Milan, Italy

[22] Filed: Mar. 15, 1971

[21] Appl. No.: 124,200

[52] U.S. Cl.................................................219/79, 219/56
[51] Int. Cl..............................................................B23k 9/12
[58] Field of Search....................219/79, 80, 56; 74/820, 821

[56] References Cited

UNITED STATES PATENTS

| | | | |
|---|---|---|---|
| 3,351,103 | 11/1967 | Grainger | 219/56 X |
| 3,161,753 | 12/1964 | Schmick | 219/79 |
| 3,517,157 | 6/1970 | Best et al. | 219/79 X |
| 3,321,606 | 5/1967 | Cropp et al. | 219/79 |

Primary Examiner—J. D. Miller
Assistant Examiner—B. A. Reynolds
Attorney—Young & Thompson

[57] ABSTRACT

Automatic welding apparatus of metal wire terminals on bodies of electronic components, comprising: mans for supporting said bodies in a plurality of positions on a step-by-step indexing turret; means for precision levelling or gauging the surfaces of the bodies to be welded, said levelling means operating at a fixed station with respect to the indexing turret; and means operating in a working station for feeding a preselected length of wire to a first operating position, for cutting said length of wire, for further feeding said length of wire up to contacting one of said bodies, and for welding the wire on the body by means of an electric discharge through the point of contact, the electric current being fed directly through the length of wire, on one side, and respectively through the supporting means of the bodies of the other side.

20 Claims, 8 Drawing Figures

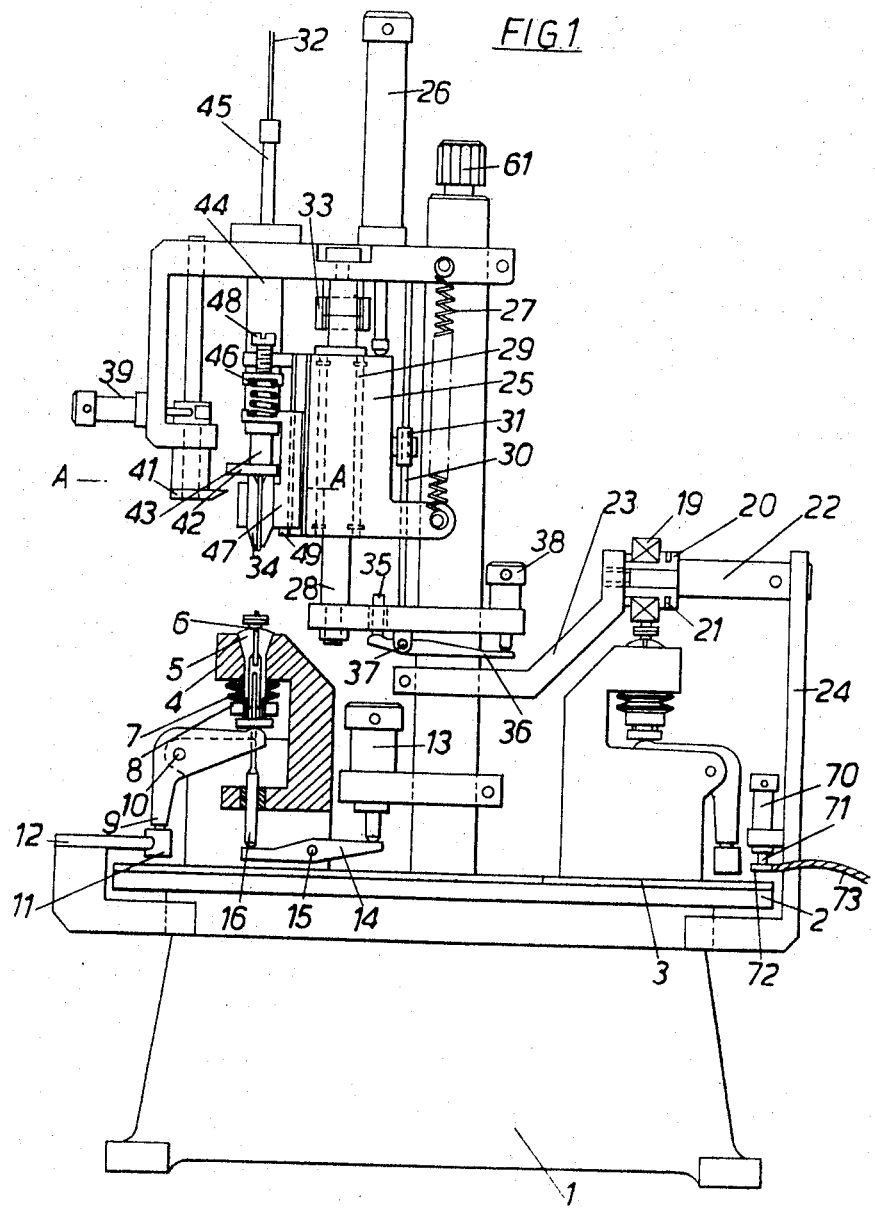

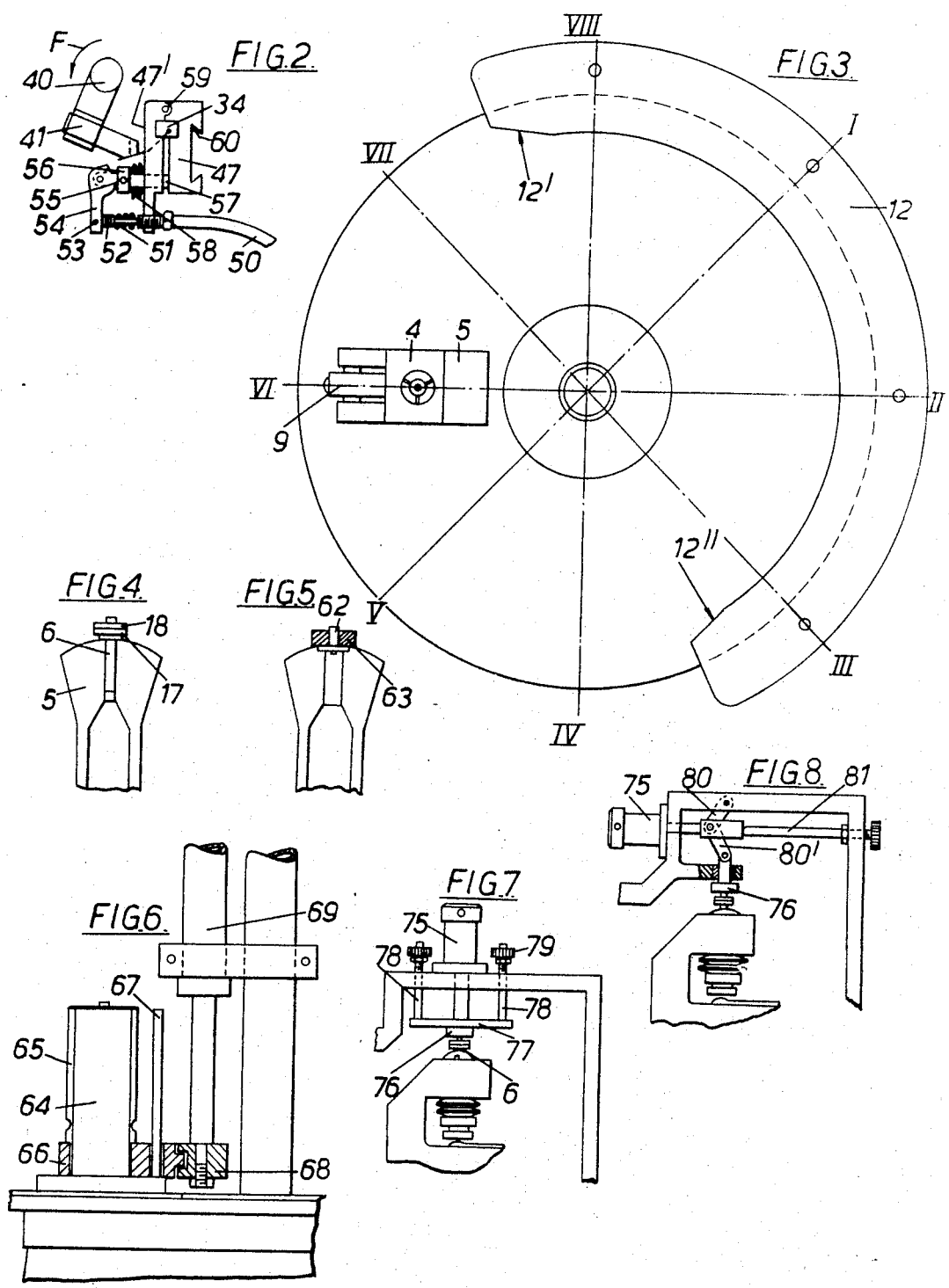

3,663,789

WELDING APPARATUS OF WIRE TERMINALS ON ELECTRONIC COMPONENTS

BACKGROUND OF THE INVENTION

Field of the Invention

The present invention refers to an apparatus for the automatic precision welding of metal wire terminals to electronic components. Though hereinafter the present invention will be described with special reference to the welding of metal wire terminals to the body or tangs of electric condensers, it is quite obvious that this invention lends itself also to other applications and uses such as, for example, the welding to other types of electronic components, that is, resistors, transistors and other similar components.

The apparatus according to the present invention uses a step-by-step indexing turret — for example, a rotating table of the type illustrated in the U.S. Pat. No. 3,362,260 — apt to transfer the pieces to be welded, successively, to loading, preparation, welding and/or unloading stations.

SUMMARY OF THE INVENTION

In similar welding apparatuses it has been found to be of an utmost importance to ensure, that the pieces to be welded will arrive always at a position that results to be perfectly registered with respect to the welding device. This is obtained, according to the present invention, both by a very accurate construction of the apparatus and by special leveling means for the pieces to be welded. In particular, the apparatus according to the present invention comprises means to support the bodies or tangs to be welded in a plurality of possible positions on a step-by-step indexing table, means to ensure the precision levelling of the surface of the bodies or tangs to be welded, functioning in a fixed position with respect to the indexing table, and means operating in at least one working station for feeding a preselected length of metal wire to a first operating position, for cutting said length of metal wire, for further feeding said length of metal wire up to bringing it by pressure into contact with the body or tang, and for welding it by means of an electric discharge through and to the position of contact.

According to a first embodiment, in a vertical axis apparatus or indexing table, the said levelling means have the form of a roller having an extremely hard outer surface and mounted idle on a fixed horizontal shaft, transversal to the path of travel of the bodies or tangs to be welded, the said roller being so positioned that the surface of each body or tang to be welded will come into contact with the surface of the roller substantially according to a tangent horizontal to this latter surface, which thus causes the pressing, that is the required gauging at the preselected level.

According to a different embodiment of the invention, the said levelling means comprise a jack, the rod of which is provided with a head apt to gauge the level and adjusting means controlling the travel of said shaft.

According to a further most important characteristic of the present invention, said electric welding discharge is realized by feeding the required voltage on one side directly through the welding wire, in a manner known per se, and on the other side to the body or tang through the relative supporting means in pincer-form.

The present invention will however be better described and understood by referring to some preferred embodiments, illustrated as examples in the enclosed drawings.

BRIEF DESCRIPTION OF THE DRAWINGS

FIG. 1 is a side view — partly in section — of the principal elements of the apparatus collected on a single plane for facilitating the illustration;

FIG. 2 is a plan view of the locking and terminal wire cutting group;

FIG. 3 is a plan view of the operating stations of the apparatus according to the present invention;

FIG. 4 is a detail of the supporting pincers and locking component of a tang (anode) for electrolytic condensers;

FIG. 5 is the detail of a different embodiment of the pincers of FIG. 4, for a different type of tang;

FIG. 6 shows the detail of a condenser body holder;

FIGS. 7 and 8 show two different embodiments of the levelling means for bodies or tangs to be welded.

DESCRIPTION OF THE PREFERRED EMBODIMENTS

As shown in FIG. 1, onto a base 1 is mounted a step-by-step rotating table 2, the surface of which is partially covered with a copper plate 3 acting as an electric connection. Onto the table 2 are fixed rests 4, equal in number to the number of stations or points of the indexing turret, each rest being designed to hold by means of locking pincers 5 a tang 6, designed to form the anode of a condenser, and to the end of which the metal wire terminal should be welded.

The lower end of the pincers 5 is threaded for receiving the locking ring 8 providing a support for the cup springs 7; the latter create a pull effect between the locking ring 8 and the body 4 to draw the pincers 5 downwards. Thanks to their conical structure, the pincers 5, when moving downward, tend to lock the piece 6. Beneath the locking ring 8 there is the upper end of a bell-crank lever 9 with its fulcrum 10 on the support rest 4; at its lower end, the bell-crank 9 carries a roller 11, operated by the cam 12, in the manner illustrated hereinafter, to impart a counterclockwise rotation to the bell-crank 9. Thanks to this rotation the upper end of the bell-crank 9 pushes the locking ring 8 upwards, and with it the pincers 5 causing the pincers 5 to open, thus freeing the piece 6.

The operation of the bell-crank 9 takes place automatically, upon rotation of the indexing turret: when the rest 4 passes from station VII (FIG. 3) to station VIII, the roller 11 meets on its path of travel the beveled profile 12' of the cam 12, in a fixed position, and moves towards the center of the turret, causing the bell-crank 9 to oscillate, against the action of springs 7, in a counterclockwise direction (with respect to FIG. 1) and loosening at the same time the pincers 5. During the travel from station VIII through stations I and II and up to station III, the roller 11 slides along the cam 12 causing the pincers 5 to remain open. When passing from station III to station IV, the roller follows the outlet profile 12" of the cam 12, causing the bell-crank 9 to oscillate in a clockwise direction (always with respect to FIG. 1) under the thrust of springs 7 and thus allowing the pincers 5 to lock. The locking pressure, considering the type of springs used, is very high. In FIG. 1, the cam 12 has been indicated in a false position, its radial width corresponding to an intermediate station, for example, in correspondence to station III, while the group of elements associated to the rest 4 is in a locking position, for example corresponding to station VI.

On rest 4 is further mounted the pneumatic cylinder 13, designed to act upon one end of the lever 14 (with fulcrum at an intermediate point 15), while the other end acts in turn on pivot 16. An oscillation of the lever 14 in a clockwise direction, under the control of cylinder 13, causes the raising of pivot 16 and hence the ejection of piece 6 out of the pincers 5, when the latter are open.

Each rest 4, during the step-by-step movement of the indexing turret, will reach successively stations I, II and III, in which the pincers 5 are open and it is possible to load the piece and eventually the washers 17, 18 (FIG. 4). At the following station IV, the pincers are already locked, keeping the piece firmly in position; in this station the piece may be levelled, as indicated hereinafter. The welding is carried out in station VI, while stations V and VII are free for possible complementary operations. Finally, at station VIII, after the cam 12 has caused the opening of the pincers 5, the finished piece is ejected and discharged.

At station IV, as already mentioned, operate the means for levelling the pieces to be welded. These means essentially comprise a roller 19 having a well hardened external surface, for example, a steel bearing. The roller is mounted, freely rotating, on an eccentric pin 20 which may be rotated by force, acting on the holes 21; this rotation permits to adjust the position in height of the rotation axis of the roller bearing 19. The eccentric pin 20 is in turn supported by the threaded pin 22, carried by the brackets 23, 24, being integral with the body of the machine. The pins 20, 22 have their axis horizontal and are so arranged that roller 19 lies on the circular travel path of the pieces 6 to be welded. When the pieces 6, carried by the indexing turret, arrive at the position of roller 19, their top will be slightly above a horizontal plane being tangent below said roller 19; the top of pieces 6 — when passing beneath the roller 19 — is then pressed and leveled up to the common level of said tangent plane. This type of construction insures therefore the important advantage of having all the top surfaces, that is, the welding surfaces of the pieces 6, exactly pressed and leveled at the same height, which is a practically essential condition for a perfect welding.

FIG. 1 finally illustrates the welding unit mounted on a carriage 25. This carriage performs reciprocating movements in a vertical direction, under the thrust of a jack 26 from top to bottom, and under the action of a return spring 27 from bottom to top. The carriage 25 is guided in its movement along the vertical shaft 28 by a ball bushing 29; a twin list 30, in cooperation with a roller 31 carried by the carriage 25, ensures the correct angular positioning of carriage 25.

The wire 32, to be welded to piece 6, is continuously fed by a reel (not shown); the wire, at its lower end, gets locked by a pair of clamps 34 associated to the carriage 25. When the carriage moves down, the clamps 34 are closed, so that the wire will be drawn forward through a length corresponding to the stroke of the carriage 25. The stroke of the carriage 25 can be adjusted by means of a ring nut 33 acting as an adjustable end-of-stroke for the carriage 25. In fact, this adjustment of the stroke of carriage 25 with the ring nut 33 determines the length of wire being fed, in other words, determines — together with the adjustable cutting means illustrated hereinafter — the length of the terminal wire to be welded.

The downward movement of carriage 25, with the clamps 34 locked and feeding wire 32, is stopped when the carriage meets the stop pin 35. The stop pin is supported by the end of a lever 36 having two different arms and the fulcrum 37 fixed to the body of the machine; on the other end of the lever 36 acts a jack 38. Under these conditions, the action of jack 26, owing to the unfavorable ratio of the arms of lever 36, is secondary to the action of jack 38.

As soon as the carriage 25 has been stopped by stop pin 35, the cutting means start to operate and will cut the wire according to a predetermined length, before welding takes place.

The cutting means comprise the control jack 39 controlling the rotation of the vertical shaft 40 about its axis and controlling in this way also the rotation of the blade 41 integral with the shaft 40, in the direction of the arrow F (see FIG. 2).

The position of rest of the blade 41 is such that the latter is normally on the path of vertical motion of the flange 42, during the downward movement of carriage 25. Flange 42, integral with the sleeve 43, will then contact the blade 41, against which it will be held, while the downward movement of carriage 25 and therewith of clamps 34 continues. During this last movement, sleeve 43 enters telescope-wise into sleeve 44 compressing a spring unit (not shown). At the end of this further movement, when the carriage 25 is resting against the stop pin 35, the flange 42 is well separated from the clamps 34 and blade 41 is free to cut the wire; thanks to the charge with which the flange 42 presses against the blade 41, and thanks to the guiding of the wire 32 by means of a hardened steel bushing, the cutting is quite easily carried out and with maximum precision.

The blade 41 and the shaft 40, in addition to being rotatable in view of the cutting operation, can also be axially displaced to permit the adjustment in height of the blade 41 and hence, in close connection with ring nut 33, the accurate adjustment of the length of the wire terminal 32 to be welded.

Once the cutting operation has been carried out, the pressure is removed from the cylinder 38, so that the lever 36 is now free to oscillate and the carriage 25 free to continue its stroke. During this further movement, the lower end of the wire 32, firmly secured by the clamps 34, bears against the piece 6 to which it is to be welded. The carriage 25 continues however its downward movement, though only for a very short length — the wire 32 and therewith also the clamps 34 and the relative supporting slide 47 being kept in the previous position — while in this phase the spring 46, resting on one side against the slide 47 and on the other side against the carriage 25 is being compressed.

The thrust produced by spring 46 on the wire 32 has a determinant effect upon the perfect carrying out of the welding operation; for this reason, the spring 46 can be preloaded, for example, by means of a setscrew 48 permitting the accurate adjustment of this preloading. When the thrust of the spring 46 is not directly transferred on the wire, that is, during the preparatory steps to the welding operation, it is simply transferred onto slide 47 resting against the tooth 49 of the carriage 25.

In the moment in which the carriage 25 has completed its downward stroke and the wire 32 is resting — held firmly down under the action of the above-mentioned predetermined load — on the piece 6, the electric welding operation takes place, for example by means of the spark discharge of an electric condenser. This discharge is obtained by means of a first conductor directly connected to the clamps 34 and a second conductor communicating with the plate 3 and hence with group 4 and piece 6.

The connection between the second conductor and the plate 3 can be obtained by means of a sliding contact of a type well known per se, or by means of a displaceable contact of the type shown in FIG. 1, formed for example by a jack 70, the rod 71 of which is provided with a contact head 72 connected to said second feeding conductor 73. The jack 70 causes the head 72 to come into contact with the plate 3 as soon as the indexing turret stops and to move off before the turret starts again its travel.

As already mentioned, the current passes from the plate 3 to the group 4, hence to the pincers 5 and the piece 6; alternatively the single parts of the pincers 5 are directly connected to the plate 3 using flexible copper leads (not shown). In any case, this arrangement — that is, current feeding through the pincers 5 — is most advantageous compared to the known technique (generally based upon the use of an electrode brought into contact with the piece 6 at the welding station), especially for the welding of very small condenser tangs (see for example FIG. 5) which practically do not present any part being accessible to an outer electrode.

FIG. 2 illustrates a special embodiment of the clamps 34 permitting to clamp the wire 32 with great force. This structure comprises a lever 47' pivoted at 59 to the slide 47 a shaft 57 integral with the slide 47, and with respect to which the free end of lever 47' is free to move; a cam 54 pivoted at the free end of shaft 57; a sleeve 56 slidingly mounted on shaft 57 and cup springs 58 resting at on side on lever 47' and at the other side against the sleeve 56; at least one roller 55 mounted on the sleeve 56 and against which acts the cam 54 to cause the displacement of said sleeve 56; a plug 52 pivoted at 53 on a control arm of the cam 54, to which is connected the end of a Bowden cable 50 controlling, in cooperation with spring 51, the position of said cam 54. As can easily be understood, the long leverage arms of levers 54 and 47' make it possible to impress a very high clamping power onto the clamps 34; the cup springs 58, in turn, make it possible to transmit this clamping power elastically against any danger of overloading.

As shown in FIG. 2, the slide 47 can be mounted on the carriage 25 by means of dovetails 60 or better still by means of prismatic guides (not shown) sliding on cylindrical rollers to ensure the maximum sensibility of the system. Two high-precision orthogonal adjustments (not shown but known per se) may also be provided between the carriage 25 and slide 47 to ensure the exact positioning of the axis of wire 32.

FIG. 4 shows in detail the supporting means of a type of anode 6 for condensers, designed for the welding thereto of a wire terminal; the anode is firmly kept by pincers 5 which clamp the longer, internal leg thereof. Washers 17, 18 are inserted on the shorter, outer leg; the top of the latter is then riveted for the levelling at the required height, this rivetting operating being also apt to lock firmly at the same time the washers 17, 18.

FIG. 5 illustrates in detail the supporting means used for a different type of anode 62, the latter being without lower leg and provided with a simple flat disk apt to be directly clamped by the pincers 5, and with an upper leg being covered with a rubber washer 63. Also in this case the rivetting operation required for levelling is apt to lock the rubber washer 63.

Finally, FIG. 6 illustrates the supporting means that permit the welding to the shell 65 of condensers. These supporting means comprise, in lieu of the rests 4, simple cylindrical bodies 64 carrying the shells 65. Extractor means are also provided, formed by a simple slider plate 66 positioned by the guide pin 67 and on which bears the open rim of the shell 65. The slider 66 is provided with a tooth engaging the fork 68 which is integral with the rod of the cylinder 69 controlling the vertical extraction movement.

FIGS. 7 and 8 illustrate two different embodiments of the rivetting and levelling means for the pieces to be welded; according to FIG. 7, these means comprise a jack 75, the rod of which carries at its free end a rivetting head 76. Jack 75 is preferably of the pneumatic type, so as to permit a very fast and accurate rivetting operation. The head 76 is integral with a cross member 77 carrying a pair of pins 78, the upper threaded ends of which are provided with knurled nuts 79 acting as adjustable end-of-stroke for the head 76, so as to obtain the levelling of the pieces 6 at the required level. In the case of the device illustrated in FIG. 8, the jack 75 does not operate directly, but by means of a toggle 80—80'; also in this case means 81 are provided for adjusting the stroke of the jack 75.

It is understood that the present invention is not limited to the examples illustrated herein, but that there are different, possible embodiments, without thereby departing from the scope of the present invention.

I claim:

1. An automatic apparatus for the precision welding of metal wire terminals, particularly on bodies or tangs of electronic components, comprising means for supporting said bodies or tangs in a plurality of positions on a step-by-step indexing turret; means for precision levelling of the surfaces of the bodies or tangs to be welded, said levelling means operating at a fixed station with respect to the indexing turret; and means operating in at least one working station for feeding a predetermined length of metal wire to a first operating position, for cutting said length of wire, for further feeding said length of wire up to contacting by pressure the body or tang, and for welding the wire on the body or tang by means of an electric discharge through the point of contact.

2. Apparatus as in claim 1, in which said supporting means of the tangs to be welded each comprise a rigid rest mounted on the indexing turret, a conical seat in said rest for housing conical parts of pincers apt to grip a tang, and spring means to force said pincers into said conical seat, causing the pincers to close and strongly lock said tang, and releasing means operating in a limited number of stations of the indexing turret, against the action of said spring means to loosen the pincers and release the tang.

3. Apparatus as in claim 2, in which said releasing means comprise a bell-crank lever, with fulcrum on each rest, the first arm of said lever acting on said pincers to release them from said conical seat against the action of said spring means, and the second arm of said lever being controlled by a fixed cam placed outside the indexing turret and which causes the oscillation of said lever when the turret indexes.

4. Apparatus as in claim 3, in which said fixed cam is formed by a fixed ring sector with beveled inlet and outlet ends, the second arm of the bell-crank lever resting — through a sliding roller carried by said arm — against said fixed ring sector.

5. Apparatus as in claim 4, in which said ring sector cam runs in correspondence with the unloading station and with at least one loading station.

6. Apparatus as in claim 5, in which said spring means comprise at least one cup spring.

7. Apparatus as in claim 1, in which said supporting means of the bodies to be welded each comprise an essentially cylindrical, rigid support mounted on the indexing turret, and a slider moving along said cylindrical support, said bodies being seated on said cylindrical support, so that their free rim rests against said slider, and releasing means acting at one station of the indexing turret to move said slider along the cylindrical support and remove the condenser body.

8. Apparatus as in claim 1, in which said levelling means comprise a roller having an extremely hard outer surface, said roller being mounted idle on an horizontal axis, transversal to the travel path of the bodies or tangs to be welded, said roller being so positioned that the surface of each body or tang to be welded will come into contact with the surface of the roller substantially according to a tangent horizontal to this latter surface, which thus causes the pressing or gauging at a predetermined level.

9. Apparatus as in claim 1, in which said levelling means comprise a jack controlling a pressure head apt to press down and level the part to be welded and means to exactly adjust the stroke of said pressure head.

10. Apparatus as in claim 9, in which said pressure head is integral with the free end of the jack rod.

11. Apparatus as in claim 9, in which said pressure head is carried by a guide pin, the latter moving under the control of a toggle, on the center point of which acts the jack.

12. Apparatus as in claim 9, in which said adjusting means comprise a screw-type end-of-stroke directly controlling the stroke of the jack.

13. Apparatus as in claim 9, in which said jack is of the pneumatic type.

14. Apparatus as in claim 1, in which the current causing the electric discharge for the welding operation is directly fed through the predetermined length of wire, on one side, and respectively through the pincers supporting means of the bodies or tangs, on the other side.

15. Apparatus as in claim 14, in which the current causing said electric discharge is directly fed on one side through a first conductor connected to the pincers holding the wire to be welded, and on the other side through a second conductor connected to the pieces to be welded by means of a copper-plate integral with the indexing turret and the pincers supporting means.

16. Apparatus as in claim 15, in which said pincers supporting means, for the tangs, are electrically connected to the copper-plate by means of flexible copper leads.

17. Apparatus as in claim 16, in which said second conductor is connected to the copper-plate through contact means, in a fixed position with respect to the indexing turret.

18. Apparatus as in claim 17, in which said contact means comprise a sliding contact.

19. Apparatus as in claim 17, in which said contact means comprise a removable contact operating the electric connection only when the indexing turret is at a standstill.

20. Apparatus as in claim 19, in which said removable contact is controlled by a pneumatic jack.

* * * * *